Patented Mar. 20, 1945

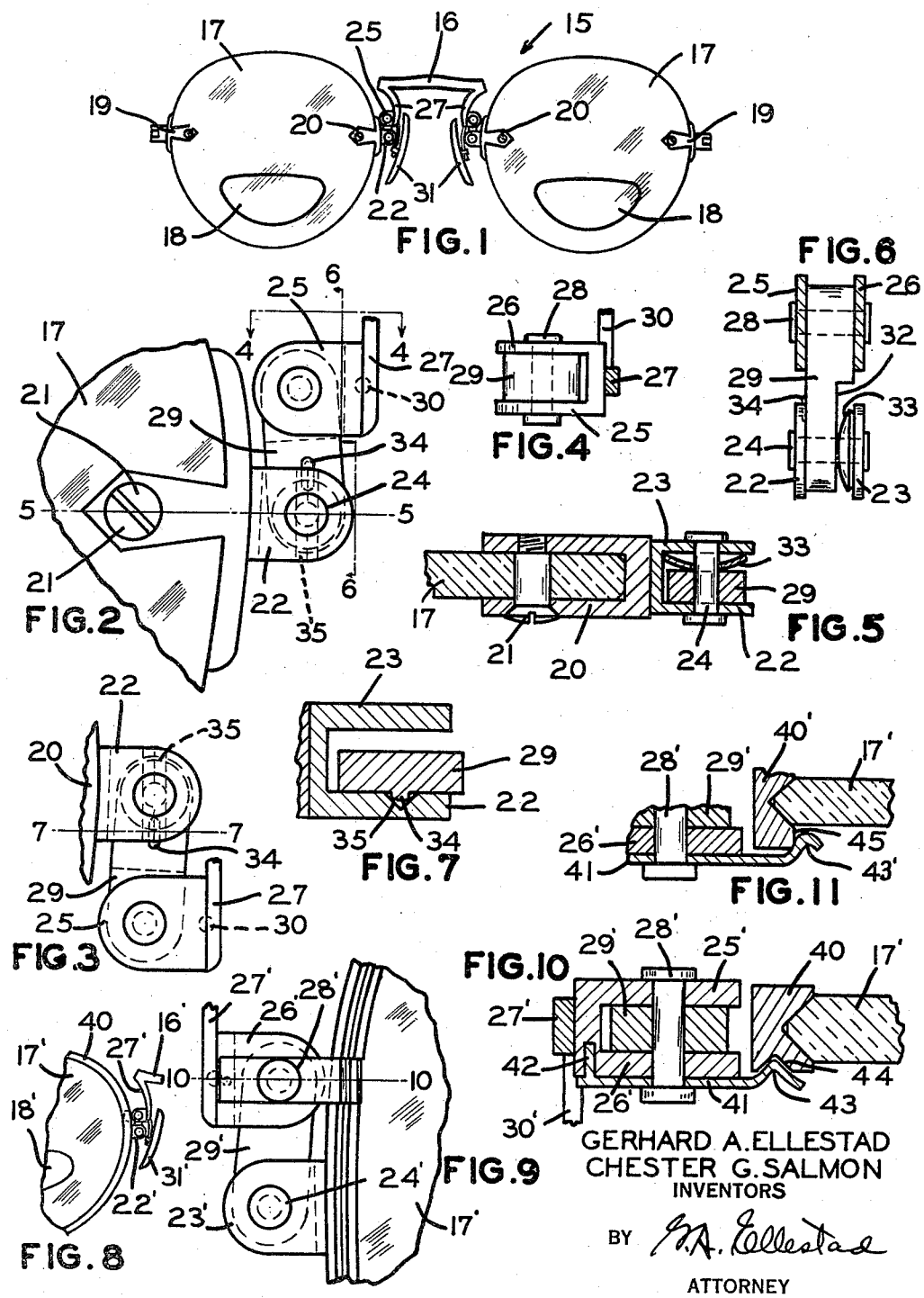

2,371,745

UNITED STATES PATENT OFFICE 2,371,745

OPHTHALMIC MOUNTING

Gerhard A. Ellestad, Rochester, and Chester G. Salmon, Greece, N. Y., assignors to Bausch & Lomb Optical Company, Rochester, N. Y., a corporation of New York Application September 20, 1941, Serial No. 411,732

3 Claims. (Cl. 88—43)

This invention relates to ophthalmic mountings and more particularly it has reference to spectacles and eyeglasses embodying multifocal lenses which may be selectively raised or lowered to locate the different portions of the multifocal lens so as to afford maximum comfort and efficiency in use.

One of the objects of our invention is to provide an ophthalmic mounting of the type described which is simple in construction yet efficient in use. Another object is to provide an ophthalmic mounting in which the lenses are pivotally connected to the bridge by links which may be selectively locked in raised or lowered position by relatively simple and inconspicuous means. A further object is to provide resilient detent means for locking in adjusted position a link pivotally connecting a lens holding device to the bridge of an ophthalmic mounting. These and other objects and advantages reside in certain novel features of construction, arrangement and combination of parts as will hereinafter be more fully described and pointed out in the appended claims.

Referring to the drawing:

Fig. 1 is a front view of a spectacle embodying our invention.

Fig. 2 is an enlarged fragmentary view showing the link connection between the lens and the bridge and with the lens in the "down" position.

Fig. 3 is a fragmentary view showing the position of the link when the lens is in the "up" position.

Fig. 4 is a view taken on line 4—4 of Fig. 2.

Fig. 5 is a horizontal section taken on line 5—5 of Fig. 2.

Fig. 6 is a view taken on line 6—6 of Fig. 2.

Fig. 7 is a view taken on line 7—7 of Fig. 3.

Fig. 8 is a fragmentary view of a spectacle embodying a modification.

Fig. 9 is a fragmentary rear view showing the link connection embodied in the modification.

Fig. 10 is a sectional view taken on line 10—10 of Fig. 9.

Fig. 11 is a similar view showing a further modification.

One embodiment of our invention is disclosed in the drawing wherein 15 indicates, generally, a spectacle having the bridge 16 connecting the two multifocal lenses 17 having the reading portions 18. Attached to the temporal sides of the lenses are the usual end pieces 19 which pivotally support the temples, not shown. The lens holding device such as the strap 20 is secured to the nasal edge of each lens by screw 21 or other suitable fastening means. Fixedly secured to each strap 20 are the inwardly extending, spaced lugs or bearing members 22 and 23 having aligned apertures through which extends the pintle 24.

The outwardly extending, spaced bearing members 25 and 26 are fixedly secured to the lower end of each side 27 of the bridge 16. The bearings 25 and 26 have aligned apertures through which extends the pintle 28. A link 29, having apertures adjacent its two ends for freely receiving the pintles 24 and 28, provides a pivotal connection between the lens holding device 20 and the bridge side 27 so that the lens holding device 20 and its attached lens 17 may be vertically adjusted relative to the bridge 16 by swinging the lens to the "up" position of Fig. 3 or the "down" position of Fig. 2. Secured to the lower end of each side 27 of bridge 16 is the rearwardly extending arm 30 which carries the nose engaging pad 31 for supporting the spectacle on the nose of the wearer.

In order to retain the lenses in the adjusted "up" or "down" position, one end of the rear side of link 29 is cut away as shown at 32 in Fig. 6 to permit a cupped spring washer 33 to be placed on pintle 24 as clearly shown in Figs. 5 and 6. The front face of link 29 is provided with an upstanding lug or projection 34 which is adapted to engage a groove or depression 35 on the inner face of bearing member 22. As will be obvious from Figs. 5 and 6, the spring washer 33 normally tends to hold the lug 34 in the groove 35 and thereby locks the link 29 in position and so retains the lens 17 in its adjusted vertical position. When it is desired to adjust the lens vertically, the lens holding device 20 and its attached lens 17 are moved so as to force the lug 34 out of the depression 35 against the tension of spring 33. The groove 35 extends entirely across the inner face of bearing member 22, as shown in dotted line in Fig. 2, so that the lug 34 may engage the groove to hold the lens in both the "up" and "down" positions.

A modification is shown in Figs. 8–10 wherein 17' indicates a multifocal lens, having reading segment 18', which is mounted in the lens holding device such as the eyewire 40 which extends around the periphery of the lens in a manner well known in the art. The side 27' of bridge 16' carries the outwardly extending bearing members 25' and 26' having aligned apertures for receiving pintle 28' while the eyewire 40 carries the spaced bearing members 22' and 23' having aligned apertures for receiving the pintle 24'. The apertured link 29' pivotally connects the two pintles 24' and 28' so that the lens 17' may be vertically adjusted with respect to bridge 16' by swinging the eyewire 40 and its lens 17' to the "up" or "down" position.

In order to retain the link 29' in either the "up" or "down" position, we have provided a resilient spring member 41 which is fixedly secured to the rear face of bearing member 26' by an integral pin 42 or other suitable means. The free end of spring 41 has a bent portion or detent 43 adapted to cooperate with a groove 44 formed on the rear face of eyewire 40 as shown in Figs. 9 and 10. The link 29' and the lens 17' will thereby be held in adjusted position and may be moved by forcing the detent 43 out of engagement with groove 44 against the tension of spring 41. In Fig. 11 we have shown a further modification in which the detent 43' engages the edge 45 of the eyewire 40' to hold the lens 17' in adjusted position. Arm 30' carries the usual nose engaging pad 31'.

From the foregoing, it will be apparent that we are able to attain the objects of our invention and provide an improved ophthalmic mounting for multifocal lenses which may be vertically adjusted relative to the bridge. Various modifications can be made without departing from the spirit of our invention as pointed out in the appended claims. The form shown in Figs. 1-7 is well adapted for use with the so-called rimless type of spectacle or eyeglass and may, of course, be equally well applied to the rimmed or semirimmed types of spectacles and eyeglasses. Various changes can also be made in the resilient locking means for retaining the lenses in adjusted position.

We claim:

1. An ophthalmic mounting comprising a pair of spaced lens holding devices carrying multifocal lenses, a bridge positioned between said devices, said bridge being the sole means connecting said devices, means for selectively adjusting the lenses to either upper or lower positions relative to the bridge to selectively position different vision fields of the lenses before the eyes of the wearer, said means being constructed so that the distance between the centers of the lenses is substantially the same when the lenses are in said upper and lower positions, said means comprising bearing means carried by the nasal sides of the respectively adjacent bridge sides and lens holding devices, pintles carried by the bearing means and a link connecting the adjacent pintles on each side of the bridge, said links being mounted on said pintles to swing in planes substantially parallel to the planes of the lenses, and resilient means carried by the bearing means for selectively holding the lenses in said upper and lower positions.

2. An ophthalmic mounting comprising a pair of spaced lens holding devices carrying multifocal lenses, a bridge positioned between said devices, said bridge being the sole means connecting said devices, means for selectively adjusting the lenses to either upper or lower positions relative to the bridge to selectively position different vision fields of the lenses before the eyes of the wearer, said means being constructed so that the distance between the centers of the lenses is substantially the same when the lenses are in said upper and lower positions, said means comprising bearing means carried by the nasal sides of the respectively adjacent bridge sides and lens holding devices, pintles carried by the bearing means and a link connecting the adjacent pintles on each side of the bridge, said links being mounted on said pintles to swing in planes which are substantially parallel to the planes of the lenses, and spring pressed detent means carried by the bearing means, said detent means having means coacting with the links for selectively holding the lenses in said upper and lower positions.

3. An ophthalmic mounting comprising a pair of spaced lens holding devices carrying multifocal lenses, a bridge positioned between said devices, said bridge being the sole means connecting said devices, means for selectively adjusting the lenses to either upper or lower positions relative to the bridge to selectively position different vision fields of the lenses before the eyes of the wearer, said means being constructed so that the distance between the centers of the lenses is substantially the same when the lenses are in said upper and lower positions, said means comprising bearing means carried by the nasal sides of the respectively adjacent bridge sides and lens holding devices, pintles carried by the bearing means and a link connecting the adjacent pintles on each side of the bridge, said links being mounted on said pintles to swing in planes substantially parallel to the planes of the lenses, said links and bearing means having cooperating projections and depressions, and spring means mounted on each pintle for urging the projections and depressions into engagement for selectively holding the lenses in adjusted positions.

GERHARD A. ELLESTAD.
CHESTER G. SALMON.